United States Patent [19]
Faraj

[11] Patent Number: 6,015,341
[45] Date of Patent: Jan. 18, 2000

[54] AIR FLOW DIVERTER

[76] Inventor: Abdul-Razzak Faraj, P.O. Box 566068, Atlanta, Ga. 31156

[21] Appl. No.: 09/200,486

[22] Filed: Nov. 25, 1998

[51] Int. Cl.⁷ ........................................... B60H 1/34
[52] U.S. Cl. ................................. 454/307; 454/152
[58] Field of Search .................... 454/152, 155, 454/307

[56] References Cited

U.S. PATENT DOCUMENTS

| | | | |
|---|---|---|---|
| 1,517,179 | 11/1924 | Thurgood | 454/307 X |
| 1,518,023 | 12/1924 | Ullom | 454/307 X |
| 1,668,712 | 5/1928 | Everhard | 454/307 X |
| 1,811,467 | 6/1931 | Gillman, Jr. | 454/307 |
| 2,724,321 | 11/1955 | Kagan | 454/307 X |
| 4,011,801 | 3/1977 | Bruns | 454/307 |
| 5,498,203 | 3/1996 | Reichert | 454/307 X |

*Primary Examiner*—Harold Joyce
*Attorney, Agent, or Firm*—John L. James

[57] ABSTRACT

A device for diverting air flow upward from an air outlet of an air conditioning system to prevent impingement of cold air on vehicle occupants contains an air foil that changes the direction of air exiting the air outlet from horizontal to vertical. The air foil has a bottom portion with connecting hooks that engage the sides of the air outlet to hold the air foil in position, and has a top potion with connecting hooks that engage the top of the air outlet to hold the air foil in position. A spring biases the top hooks upward toward the top of the air outlet.

4 Claims, 1 Drawing Sheet

AIR FLOW DIVERTER

FIELD OF THE INVENTION

The present invention relates generally to air conditioning systems, and, more particularly, to an air flow diverter for an automotive air conditioning system to reduce impingement of cold air on vehicle occupants.

BACKGROUND OF THE INVENTION

Conditioned air enters a passenger compartment of a vehicle through air outlet ducts in the front dashboard. The air outlet ducts have movable louvers to direct air to the left or right and also up or down to direct air where needed. Quite often, the louvers are used to direct cold air away from vehicle occupants so that the cold air does not impinge on the vehicle occupants. When conditioned air impinges on vehicle occupants, the occupants often feel quite cool and therefore uncomfortable. Occupants often experience chill bumps on the arms or other exposed portions of the body. While adjusting the louvers offers a bit of relief, cold air still impinges on the occupants causing many vehicle operators to turn the air conditioning off and then on again when they become uncomfortable. Accordingly, it will be appreciated that it would be highly desirable to have an air flow diverter that would prevent impingement of the cold air on the vehicle occupants.

SUMMARY OF THE INVENTION

Briefly summarized, according to one aspect of the present invention, a device for diverting air flow from an air outlet of an air conditioning system comprises an airfoil having a bottom portion extending laterally and horizontally and a top portion extending laterally and vertically. The bottom portion terminates at a bottom edge face and defines left and a right openings that extend horizontally from the bottom edge face inward toward the top portion. A bottom connector has base member, a left pin extending from the base member adapted to engage the left opening, a right pin extending from the base member adapted to engage the right opening, a left hook extending from the base member adapted to engage the left side of the air outlet, and a right hook extending from the base member adapted to engage the right side of the air outlet. A top connector has a left rail pivotally connected to the top portion of the air foil, a left hook extending from the left rail adapted to engage the top of the air outlet, a right rail pivotally connected to the top portion of the air foil, a right hook extending from the right rail adapted to engage the top of the air outlet, and a cross member fastened to the left and right rails and extending between the left and right rails. A coil spring has one end attached to the top potion of the air foil at a higher elevation than the top connector and has its other end attached to the cross member to bias the left and right hooks of the top connecting member upward.

The device is attached to the air outlet using the hooks. Air exiting the outlet travels horizontally along the bottom portion of the air foil and is diverted vertically by the top portion of the air foil. The conditioned air is thereby available to cool the vehicle interior without impinging on the occupants. There is no need for the vehicle operator to manually cycle the air conditioner on and off for occupant comfort because there is no impingement. During winter months, the air foil can be removed leaving the bottom connecting member attached to the outlet.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
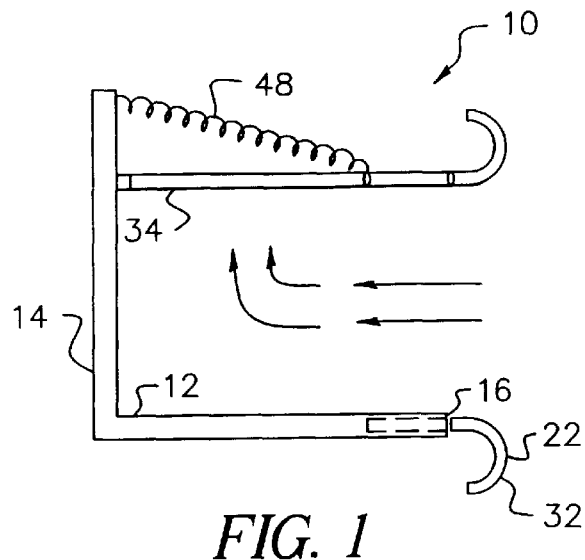
FIG. 1 is a diagrammatic side view of a preferred embodiment of an air flow diverter according to the present invention.
Figure 2:
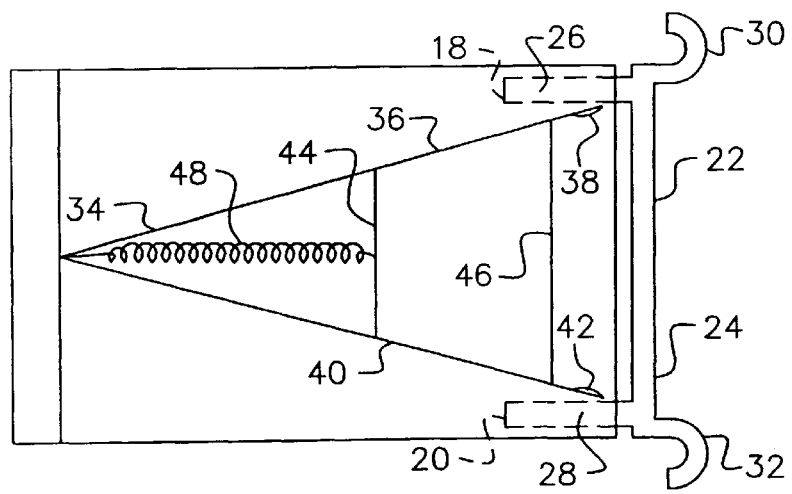
FIG. 2 is a top view of the air flow diverter of FIG. 1.
Figure 3:
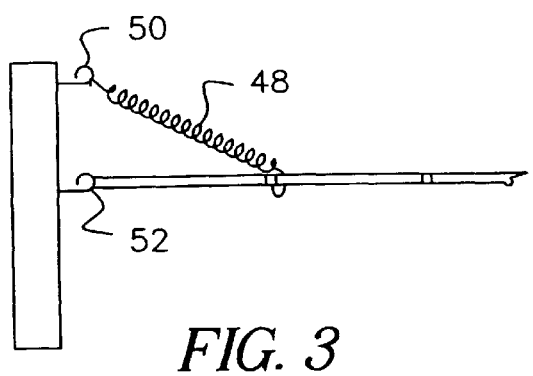
FIG. 3 somewhat enlarged view of a portion of FIG. 1 further illustrating the pivotal connections of the spring and top connector.

Referring to FIGS. 1–3, an airfoil 10 has a bottom portion 12 extending laterally and horizontally and a top portion 14 extending laterally and vertically to divert air exiting an air outlet of an air conditioning system of a vehicle from a generally horizontal flow to a vertical flow to prevent impingement of cold air on vehicle occupants. Bottom portion 12 terminates at a bottom edge face 16 and defines left and right openings 18, 20 that extend horizontally from edge face 16 into bottom portion 12 toward top portion 14.

A bottom connector 22 is releasably attached to bottom portion 12 of air foil 10. It has a base member 24 with a left pin 26 extending from base member 24 adapted to engage the left opening 18. A right pin 28 extending from base member 24 is adapted to engage the right opening 20. Openings 18, 20 are preferably cylindrical openings or bores with the pins 26, 28 being cylindrical to fit in the bores, but other configurations that allow mating of the pins and openings can be used. A left hook 30 extends from the base member 24 opposite the left pin 26 and is adapted to engage the left side of the air outlet. Left hook 30 preferably curves laterally away from the central opening of the air outlet toward the left side of the air outlet. A right hook 32 extends from the base member 24 opposite the right pin 28 and is adapted to engage the right side of the air outlet. Right hook 32 preferably curves laterally away from the central opening of the air outlet toward the right side of the air outlet. The hooks 30, 32 curve away from one another and are resilient so that they can be squeezed toward one another for insertion into the air outlet. Hooks 30 and 32 span a distance greater than the distance between the left and right sides of the air outlet. When inserted into the air outlet, the resilient hooks try to return to their original configuration and thereby press against the left and right sides of the air outlet to wedge the bottom connector 16 in the air outlet opening to attach itself to the air outlet. Because hooks 30, 32 hold bottom connector 22 in position by exerting an outward force against the inside walls of the air outlet, flat protrusions or fingers could be used instead of curved hooks. Hooks are preferable to prevent dislodging of the bottom connector due to vehicle vibration encountered during normal driving conditions. Hooks can physically engage the trim about the air outlet opening to prevent dislodging. Also, hooks can engage the louvers in the air outlet.

A top connector 34 has a left rail 36 pivotally connected to the top portion 14 of the air foil with a left hook 38 extending from the left rail 36 that is adapted to engage the top of the air outlet. A right rail 40 is pivotally connected to the top portion 14 of the air foil with a right hook 42 extending from the right rail 40 that is adapted to engage the top of the air outlet. Hooks 38 and 40 preferably curve slightly upward to engage the top of the aid outlet when inserted inside the air outlet. The hooks 38, 42 are spaced from one another with left hook 38 near the left side of the air outlet and right hook 42 near the right side of the air outlet. The left and right rails 36, 40 are preferably connected to one another at the pivot point.

A cross member 44 is fastened to the rails 36, 40 and extends between them. A brace 46 is connected to rails 36, 38 and extends between them at a location between the cross member 44 and the left and right hooks 38, 42. Top connector 34 is preferably constructed of plastic with the cross member 44 and brace 46 adding rigidity and structural integrity. It is desirable to have the rails and cross member as thin as possible so that they do not restrict air flow.

A coil spring 48 has one end attached to the top portion 14 of the air foil 10 at a higher elevation than the top connector 34 and has its other end attached to the cross member 44 to bias the left and tight hooks 38, 42 of the top connecting member 34 upward. Coil spring 48 may have one end attached to the top portion 14 using a hook 50 that is connected to the top portion of the air foil, and may have its other end entwined about cross member 44 or attached using a hook on the cross member. Similarly, a hook 52 may be used for the pivotal connection of the left and right rails 38, 42 when they are formed of a single piece of material. Hook 52 engages the rails 38 and 42 at their intersection with one another.

Operation of the present invention is believed to be apparent from the foregoing description and drawings, but a few words will be added for emphasis. The device is initially installed in two stages. The first stage is to install the bottom connector 22 by squeezing the hooks 30, 32 to move them towards one another while inserting the hooks into the air outlet. Releasing the hooks allows them to spring back to their original positions thereby engaging the sides of the air outlet to hold the bottom connector in position. The second stage attaches the air foil by aligning the openings 18, in the bottom portion 12 with their mating pins 26, 28 in the bottom connector 22 while depressing the left and right rails 36, 38 to insert the rail hooks 38, 42 into the air outlet. Releasing the rails allows the coil spring 48 to raise the rails so that the rail hooks a forced against the top of the air outlet thereby holding the air foil in position. The air foil can be removed by depressing the rails to disengage the rail hooks and pulling horizontally to disengage the air foil from the pins. This separates the top and bottom portions of the air foil from the bottom connector which remains attached to the air outlet.

It can now be appreciated that an air flow diverter has been presented for used in a vehicle to divert conditioned air upward away from direct impingement on vehicle occupants. It easily attaches to an air outlet using only one hand. It can be constructed of plastic in a neutral color or in a color to match the interior decor of the vehicle. It can be partially disassembled and removed for winter storage when it is not needed.

While the invention has been described with particular reference to the preferred embodiment, it will be understood by those skilled in the art that various changes may be made and equivalents may be substituted for elements of the preferred embodiments without departing from invention. For example, the device can be constructed of metal instead of plastic.

As is evident from the foregoing description, certain aspects of the invention are not limited to the particular details of the examples illustrated, and it is therefore contemplated that other modifications and applications will occur to those skilled in the art. For example, there may be curved transition between the top and bottom portions of the air foil to decrease resistance to air flow, or for aesthetic appeal. It is accordingly intended that the claims shall cover all such modifications and applications as do not depart from the true spirit and scope of the invention.

What is claimed is:

1. A device for diverting air flow upward from an air outlet of an air conditioning system, said air outlet having a top, a bottom, a left side and a right side, said device comprising:

an airfoil having a bottom portion extending laterally and horizontally and a top portion extending laterally and vertically said bottom portion terminating at a bottom edge face and defining a left opening and a right opening, said openings extending horizontally from said bottom edge face inward toward said top portion;

a bottom connector having base member, a left pin extending from said base member adapted to engage said left opening, a right pin extending from said base member adapted to engage said right opening, a left hook extending from said base member adapted to engage said left side of said air outlet, and a right hook extending from said base member adapted to engage said right side of said air outlet, a top connector having a left rail pivotally connected to said top portion of said air foil, a left hook extending from said left rail adapted to engage said top of said air outlet, a right rail pivotally connected to said top portion of said air foil, a right hook extending from said right rail adapted to engage said top of said air outlet, and a cross member fastened to said left and right rails and extending between said left and right rails; and a coil spring having one end attached to said top potion of said air foil at a higher elevation than said top connector and having its other end attached to said cross member to bias said left and tight hooks of said top connecting member upward.

2. A device, as set forth in claim 1, including a brace connected to said left and right rails and extending between said left and right rails at a location between said cross members and said left and right hooks.

3. A device, as set forth in claim 1, wherein said left and right hooks of said bottom connector are resilient members that return to an original configuration when deformed for insertion into said air duct.

4. A device for diverting air flow upward from an air outlet of an air conditioning system, said air outlet having a top, a bottom, a left side and a right side, said device comprising:

an airfoil having a bottom portion extending laterally and horizontally and a top portion extending laterally and vertically, said bottom portion terminating at a bottom edge face and defining a left opening and a right opening, said openings extending horizontally from said bottom edge face inward toward said top portion;

a bottom connector having base member, a left pin extending from said base member adapted to engage said left opening, a right pin extending from said base member adapted to engage said right opening, a resilient left hook extending from said base member adapted to engage said left side of said air outlet, and a resilient right hook extending from said base member adapted to engage said right side of said air outlet, a top connector having a left rail pivotally connected to said top portion of said air foil, a left hook extending from said left rail adapted to engage said top of said air outlet, a right rail pivotally connected to said top portion of said air foil, a right hook extending from said right rail adapted to engage said top of said air outlet, and a cross member fastened to said left and right rails and extending between said left and right rails;

a brace connected to said left and right rails and extending between said left and right rails at a location between said cross members and said left and right hooks; and a coil spring having one end attached to said top potion of said air foil at a higher elevation than said top connector and having its other end attached to said cross member to bias said left and tight hooks of said top connecting member upward.

* * * * *